(12) United States Patent
Zhang et al.

(10) Patent No.: US 11,009,613 B2
(45) Date of Patent: May 18, 2021

(54) READING APPARATUS FOR X-RAY DETECTOR AND METHOD FOR USING READING APPARATUS, AND X-RAY DETECTOR

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhengxin Zhang, Beijing (CN); Shuai Xu, Beijing (CN); Yong Song, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 16/358,249

(22) Filed: Mar. 19, 2019

(65) Prior Publication Data

US 2019/0293811 A1  Sep. 26, 2019
US 2020/0271798 A9  Aug. 27, 2020

(30) Foreign Application Priority Data

Mar. 23, 2018  (CN) .......................... 201810244697.5

(51) Int. Cl.
*G01T 1/24* (2006.01)

(52) U.S. Cl.
CPC .................... *G01T 1/247* (2013.01)

(58) Field of Classification Search
CPC ..................................................... G01T 1/247
See application file for complete search history.

(56) References Cited

U.S. PATENT DOCUMENTS

| | | | |
|---|---|---|---|
| 2015/0168137 A1* | 6/2015 | Pauly ................... | G01N 23/203 378/87 |
| 2016/0366351 A1* | 12/2016 | Ryu ...................... | H04N 5/374 |
| 2019/0039939 A1* | 2/2019 | Bookbinder ........... | C03B 29/08 |
| 2019/0154473 A1* | 5/2019 | Li ........................... | G01D 3/02 |

FOREIGN PATENT DOCUMENTS

| | | |
|---|---|---|
| CN | 101518056 B | 11/2012 |
| TW | I488500 B | 6/2015 |
| TW | I570425 B | 2/2017 |

* cited by examiner

*Primary Examiner* — Yara B Green
(74) *Attorney, Agent, or Firm* — Armstrong Teasdale LLP

(57) ABSTRACT

Embodiments of the present disclosure provide a reading apparatus for an X-ray detector, a method for using the reading apparatus, and the X-ray detector. The reading apparatus includes a control circuit, a compensation circuit, and a processing circuit. The control circuit is configured to provide, in a first phase, a first signal to an input terminal of the compensation circuit according to a reference signal and a dark current in a sense device of the X-ray detector, and provide, in a second phase, a second signal from the sense device to the input terminal of the compensation circuit. The compensation circuit is configured to generate, in the first phase, a compensation signal according to the first signal, and compensate, in the second phase, the second signal according to the compensation signal, to generate a third signal. The processing circuit is configured to process the third signal.

17 Claims, 3 Drawing Sheets

READING APPARATUS FOR X-RAY DETECTOR AND METHOD FOR USING READING APPARATUS, AND X-RAY DETECTOR

CROSS REFERENCE TO RELATED APPLICATIONS

This patent application claims the benefit and priority of Chinese Patent Application No. 201810244697.5 filed on Mar. 23, 2018, the disclosure of which is incorporated by reference herein in its entirety as part of the present application.

BACKGROUND

The present disclosure relates to the field of X-ray detection technologies, and more particularly, to a reading apparatus for an X-ray detector, a method for using the reading apparatus, and an X-ray detector.

As a digital X-ray radiography developed in the 1990s, the X-ray radiography has become a dominant direction of the digital X-ray photography because of its significant advantages such as fast imaging speed, high resolution, and convenient operation, etc. X-ray detectors are implemented based on the X-ray radiography.

BRIEF DESCRIPTION

Embodiments of the present disclosure provide a reading apparatus for an X-ray detector, a method for using the reading apparatus, and the X-ray detector.

A first aspect of the present disclosure provides a reading apparatus for an X-ray detector. The reading apparatus may include a control circuit, a compensation circuit, and a processing circuit. The control circuit may provide, in a first phase, a first signal to an input terminal of the compensation circuit according to a reference signal and a dark current in a sense device of the X-ray detector, and provide, in a second phase, a second signal from the sense device to the input terminal of the compensation circuit. The compensation circuit may generate, in the first phase, a compensation signal according to the first signal, and compensate, in the second phase, the second signal according to the compensation signal, to generate a third signal. The processing circuit may process the third signal.

In some embodiments of the present disclosure, the control circuit may include a first switching element and a second switching element. An end of the first switching element is coupled to an input terminal of the reading apparatus, and another end of the first switching element is coupled to the reference signal. An end of the second switching element is coupled to the input terminal of the reading apparatus, and another end of the second switching element is coupled to the input terminal of the compensation circuit.

In some embodiments of the present disclosure, the compensation circuit may include a calculation unit, a storage unit, and a compensation unit. The calculation unit may generate the compensation signal according to the first signal. The storage unit may store the compensation signal. The compensation unit may compensate the second signal according to the compensation signal stored, to generate the third signal.

In some embodiments of the present disclosure, the compensation circuit may include a calculation unit, a storage unit, and a compensation unit. The calculation unit may generate the compensation signal according to the first signal. The storage unit may store the compensation signal. The compensation unit may compensate the second signal according to the compensation signal stored, to generate the third signal.

In some embodiments of the present disclosure, the calculation unit includes a subtracter. A first input terminal of the subtracter receives the first signal, a second input terminal of the subtracter receives the reference signal, and an output terminal of the subtracter provides the compensation signal.

In some embodiments of the present disclosure, the compensation unit includes a summator. A first input terminal of the summator receives the compensation signal, a second input terminal of the summator receives the second signal, and an output terminal of the summator provides the third signal.

In some embodiments of the present disclosure, the calculation unit may include a first amplifier, a first resistor, a second resistor, a third resistor, and a fourth resistor. An end of the first resistor is coupled to a first input terminal of the first amplifier, and another end of the first resistor is coupled to the output terminal of the first amplifier. An end of the second resistor is coupled to the first input terminal of the first amplifier, and another end of the second resistor is coupled to the input terminal of the compensation circuit. An end of the third resistor is coupled to a second input terminal of the first amplifier, and another end of the third resistor is coupled to the reference signal. An end of the fourth resistor is coupled to the second input terminal of the first amplifier, and another end of the fourth resistor is grounded. An output terminal of the first amplifier is coupled to the storage unit.

In some embodiments of the present disclosure, the first resistor, the second resistor, the third resistor, and the fourth resistor have an equal resistance value.

In some embodiments of the present disclosure, the compensation unit may include a second amplifier, a fifth resistor, a sixth resistor, a seventh resistor, an eighth resistor, and a ninth resistor. An end of the fifth resistor is coupled to a first input terminal of the second amplifier, and another end of the fifth resistor is coupled to the output terminal of the second amplifier. An end of the sixth resistor is coupled to the first input terminal of the second amplifier, and another end of the sixth resistor is grounded. An end of the seventh resistor is coupled to a second input terminal of the second amplifier, and another end of the seventh resistor is coupled to the second signal. An end of the eighth resistor is coupled to the second input terminal of the second amplifier, and another end of the eighth resistor is coupled to the storage unit to receive the compensation signal. An end of the ninth resistor is coupled to the second input terminal of the second amplifier, and another end of the ninth resistor is grounded. An output terminal of the second amplifier is coupled to the processing circuit.

In some embodiments of the present disclosure, the fifth resistor, the seventh resistor, and the eighth resistor have an equal resistance value, and the sixth resistor and the ninth resistor have an equal resistance value.

In some embodiments of the present disclosure, the processing circuit may include a third amplifier and a first capacitor. The first input terminal of the third amplifier is coupled to the output terminal of the compensation circuit, a second input terminal of the third amplifier is coupled to the reference signal, and an output terminal of the third amplifier provides the third signal. The first capacitor is coupled between the first input terminal of the third amplifier and the output terminal of the third amplifier.

In some embodiments of the present disclosure, the control circuit may include a first switching element and a second switching element. An end of the first switching element is coupled to the input terminal of the reading apparatus, and another end of the first switching element is coupled to the first input terminal of the third amplifier. An end of the second switching element is coupled to the input terminal of the reading apparatus, and another end of the second switching element is coupled to the input terminal of the compensation circuit.

In some embodiments of the present disclosure, the reading apparatus may further include a reset unit. The reset unit is coupled between an input terminal of the processing circuit and an output terminal of the processing circuit.

In some embodiments of the present disclosure, the reset unit may include a third switching element. The third switching element is coupled between the first input terminal of the third amplifier and the output terminal of the third amplifier.

In some embodiments of the present disclosure, the reading apparatus may further include a filter and an analog-to-digital converter. The filter is configured to filter the third signal processed. The analog-to-digital converter is configured to convert the third signal filtered.

A second aspect of the present disclosure provides an X-ray detector. The X-ray detector includes a reading apparatus and a sense device. The reading apparatus includes the reading apparatus provided by the first aspect of the present disclosure.

A third aspect of the present disclosure provides a method for using the reading apparatus according to the first aspect of the present disclosure. The method is configured to read an X-ray detector. According to the method, in a first phase, a first signal is provided to an input terminal of the compensation circuit according to a reference signal and a dark current in a sense device of the X-ray detector, such that a compensation signal is generated according to the first signal. In a second phase, a second signal from the sense device is provided to the input terminal of the compensation circuit, the second signal is compensated according to the compensation signal to generate a third signal, and the third signal is processed.

In some embodiments of the present disclosure, in the first phase, the providing the first signal includes providing a reference voltage to the input terminal of the compensation circuit in response to the sense device being in a dark state, and then stopping providing the reference voltage. After providing the reference voltage is stopped, the first signal is provided to the input terminal as a result that a voltage at the input terminal is smaller than the reference voltage due to electric leakage caused by the dark current of the sense device. The generating the compensation signal includes calculating a difference, as the compensation signal, between the first signal and the reference signal. The compensating, in the second phase, the second signal to generate the third signal includes calculating a sum, as the third signal, of the second signal and the compensation signal. The processing the third signal includes filtering and performing analog-to-digital conversion on the third signal.

As described above, the embodiments of the present disclosure provides a drive design which can improve unevenness in gradation of an X-ray detector. It is considered a negative effect of electric leakage caused by the dark current of each sense device (such as a photodiode) of the X-ray detector on the voltage at the input terminal in the dark state. Before the actual sensing, the difference between the actual voltage at the input terminal in the dark state and the reference voltage is taken as a voltage compensation reference value corresponding to the dark current for each sense device, such that an active front end (AFE) unit of each sense device can have its own independent compensation reference value. Therefore, in a sense mode of the sense device in the dark state or bright state, the sense voltage is compensated by the compensation reference value, and then is subjected to operational amplification and analog-to-digital conversion, to obtain a homogenized digital signal, that is, homogenized gradation can be displayed.

BRIEF DESCRIPTION OF THE DRAWINGS

To describe the technical solutions of the present disclosure more clearly, the accompanying drawings of the embodiments will be briefly introduced below. It is to be known that the accompanying drawings in the following description merely involve with some embodiments of the present disclosure, but not limit the present disclosure. In the figures.

DETAILED DESCRIPTION

Figure 1:
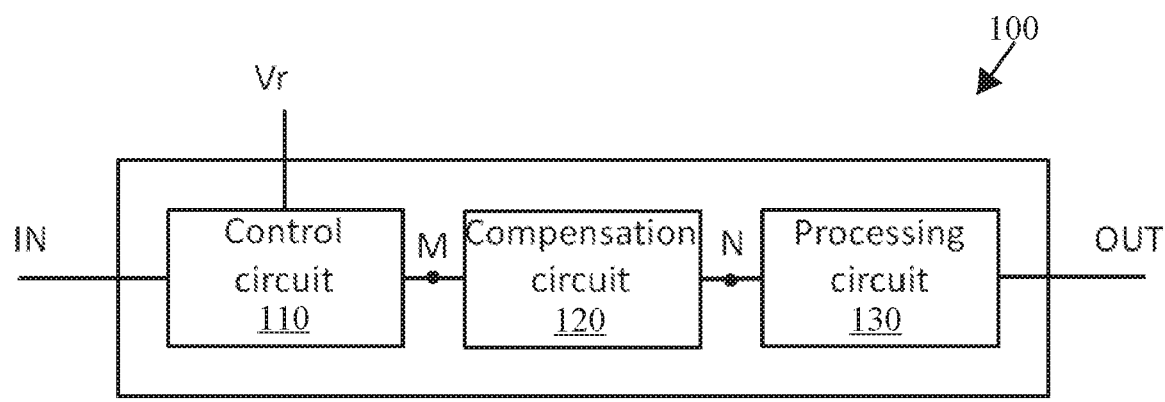
FIG. 1 illustrates a schematic block diagram of a reading apparatus according to an embodiment of the present disclosure.

To make technical solutions and advantages of the embodiments of the present disclosure clearer, the technical solutions in the embodiments of the present disclosure will be described clearly and completely below, in conjunction with the accompanying drawings. Apparently, the described embodiments are merely some but not all of the embodiments of the present disclosure. All other embodiments obtained by those of ordinary skill in the art based on the described embodiments without creative efforts shall fall within the protection scope of the present disclosure.

In the description of the present disclosure, "a plurality" means two or more unless otherwise stated. The orientation or position relations represented by the terms of "above", "beneath", "left", "right", "inside", "outside" and the like are orientation or position relations shown based on the accompanying figures, they are merely for ease of a description of the present disclosure and a simplified description instead of being intended to indicate or imply the apparatus or element to have a special orientation or to be configured and operated in a special orientation. Thus, they cannot be understood as limiting of the present disclosure.

In the description of the present disclosure, it is to be noted that unless explicitly specified or limited otherwise, terms "installation", "connecting" or "coupling" should be understood in a broad sense, which may be, for example, a fixed connection, a detachable connection or integrated connection, a mechanical connection or an electrical connection, a direct connection or indirect connection by means of an intermediary. For those of ordinary skill in the art, specific meanings of the above terms in the present disclosure may be understood based on specific circumstances.

In a digital X-ray radiography system, a flat panel X-ray detector is generally employed, wherein its pixel size may be less than 0.1 mm, which plays an important role in imaging quality. In some embodiments, a sense unit (for example, a photosensitive sensor, or a photosensitive diode) of the flat panel X-ray detector generates charge accumulation after X-ray irradiation, and a control device (for example, a TFT transistor) on the flat panel X-ray detector is controlled to be enabled in turn. A reading apparatus for the flat panel X-ray detector reads out the quantity of electric charges on the sense unit. Then, the read-out data signal is processed and converted into a digital signal by an amplifier, an analog-to-digital converter (ADC), etc., and then the digital signal is transmitted to a field programmable gate array (FPGA) or a digital signal processor (DSP) to perform digital signal image processing.

Different sense units may have different tiny leakage currents (i.e., dark currents) in a dark state, thus there may be a difference in grayscale brightness (i.e., dark state grayscale) after detection and processing when no illumination occurs. The dark state grayscale is one of the important parameters of the flat panel X-ray detector. Different dark state grayscales may result in the unevenness of the overall grayscale, thereby causing dot and line defects. In addition, in the case of a bright state, the difference in the leakage currents of different sense units may also result in unreliable test results.

Embodiments of the present disclosure provide a reading apparatus for an X-ray detector, a method for using the reading apparatus, and the X-ray detector. Implementations of the present disclosure are further described in detail below with reference to the accompanying drawings and the embodiments. The following embodiments are intended to describe the present disclosure but are not intended to limit the scope of the present disclosure.

FIG. 1 illustrates a schematic block diagram of a reading apparatus according to an embodiment of the present disclosure. The reading apparatus may be configured to read an X-ray detector.

As shown in FIG. 1, the reading apparatus 100 may include a control circuit 110, a compensation circuit 120, and a processing circuit 130. The control circuit 110 is coupled to an input terminal IN of the reading apparatus 100 and an input terminal IN of the compensation circuit 120. The input terminal IN receives, for example, a signal sensed by a sense unit of the X-ray detector. The control circuit 110 may provide, in a first phase, a first signal V1 to an input terminal M of the compensation circuit according to a reference signal Vr and a dark current in a sense device of the X-ray detector, and provide, in a second phase, a second signal V2 from the sense device to the input terminal M of the compensation circuit.

The input terminal M of the compensation circuit 120 is coupled to the control circuit 110, and an output terminal N of the compensation circuit 120 is coupled to the processing circuit 130. The compensation circuit 120 may generate, in the first phase, a compensation signal Vc according to the first signal V1, and compensate, in the second phase, the second signal V2 according to the compensation signal Vc, to generate a third signal V3.

An input terminal of the processing circuit 130 is coupled to the output terminal N of the compensation circuit 120, and an output terminal of the processing circuit 130 is coupled to an output terminal OUT of the reading apparatus 100. The processing circuit 130 may process, for example, amplify the third signal V3.

Figure 2:
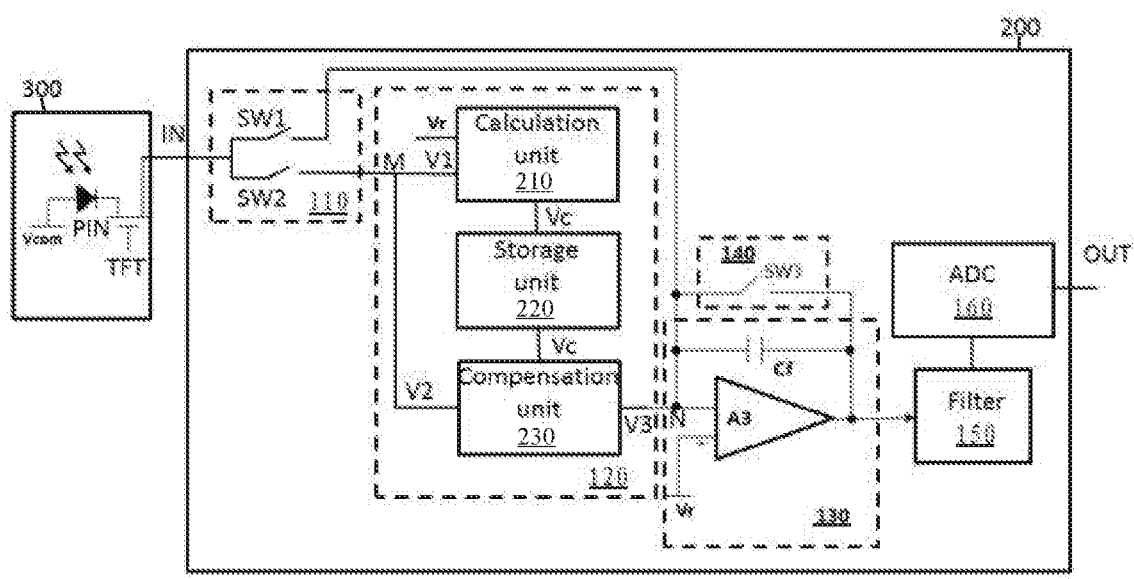
FIG. 2 illustrates a schematic circuit diagram of reading an X-ray detector by a reading apparatus according to an embodiment of the present disclosure.

FIG. 2 illustrates a schematic diagram of reading an X-ray detector by a reading apparatus according to an embodiment of the present disclosure. As shown in FIG. 2, a sense unit 300 in the X-ray detector is read by a reading apparatus 200. The reading apparatus 200 includes the control circuit 110, the compensation circuit 120, and the processing circuit 130 as shown in FIG. 1.

The respective circuits of the reading apparatus 200 is further described in detail below. As shown in FIG. 2, the control circuit 110 may include a first switching element SW1 and a second switching element SW2. An end of the first switching element SW1 is coupled to an input terminal IN of the reading apparatus, and another end of the first switching element SW1 is coupled to the reference signal Vr. In some embodiments of the present disclosure, the other end of the first switching element SW1 is coupled to, for example, an end of the processing circuit 130 to obtain the reference signal Vr, which will be described in detail below. An end of the second switching element SW2 is coupled to the input terminal IN of the reading apparatus, and another end of the second switching element SW2 is coupled to the input terminal M of the compensation circuit.

In addition, the compensation circuit 120 may include a calculation unit 210, a storage unit 220, and a compensation unit 230. In this embodiment, the calculation unit 210 may generate the compensation signal Vc according to the first signal V1 and the reference signal Vr. The storage unit 220 may store the compensation signal Vc. The compensation unit 230 may compensate the second signal V2 according to the stored compensation signal Vc, such that the third signal V3 can be generated.

In some embodiments of the present disclosure, the calculation unit 210 includes a subtracter. A first input terminal of the subtracter receives the first signal V1, a second input terminal of the subtracter receives the reference signal Vr, and an output terminal of the subtracter provides the compensation signal Vc. The storage unit 220 may include a random access memory (RAM) or other memories. The compensation unit 230 includes a summator. A first input terminal of the summator receives the compensation signal Vc, a second input terminal of the summator receives the second signal V2, and an output terminal of the summator provides the third signal V3.

Figure 3:
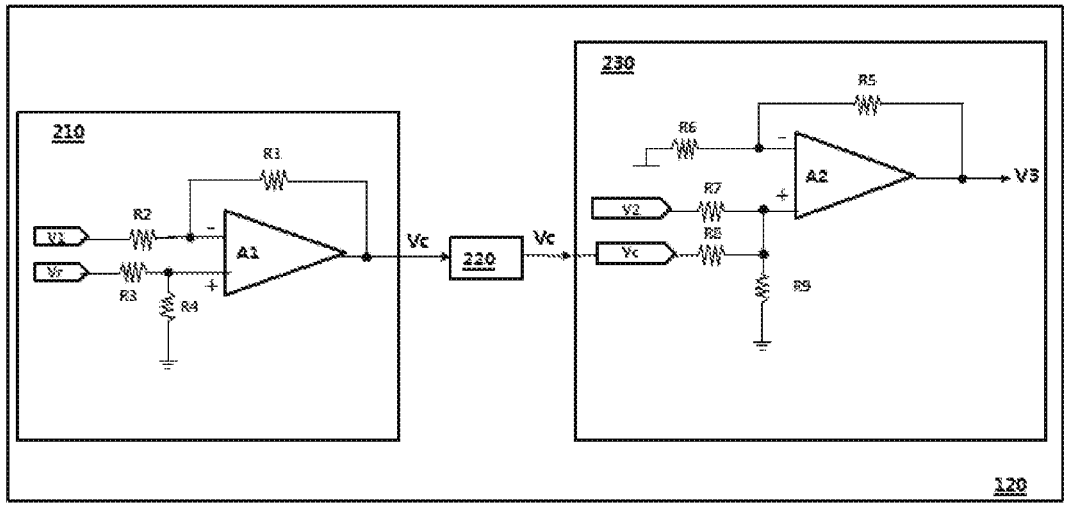
FIG. 3 illustrates an exemplary circuit diagram of a compensation circuit according to an embodiment of the present disclosure.

Further, FIG. 3 illustrates an exemplary circuit diagram of a compensation circuit according to an embodiment of the present disclosure.

As shown in FIG. 3, the calculation unit 210 includes a first amplifier A1, a first resistor R1, a second resistor R2, a third resistor R3, and a fourth resistor R4. In this embodiment, an end of the first resistor R1 is coupled to a first input terminal (−) of the first amplifier, and another end of the first resistor R1 is coupled to the output terminal of the first amplifier A1. An end of the second resistor R2 is coupled to the first input terminal (−) of the first amplifier A1, and another end of the second resistor R2 is coupled to the input terminal M of the compensation circuit, i.e., coupled to the control circuit 110 to receive the first signal V1. An end of the third resistor R3 is coupled to a second input terminal (+) of the first amplifier A1, and another end of the third resistor R3 receives the reference signal Vr. An end of the fourth resistor R4 is coupled to the second input terminal (+) of the first amplifier A1, and another end of the fourth resistor R4 is grounded. An output terminal of the first amplifier A1 is coupled to the storage unit 220 to provide the compensation signal Vc to the storage unit 220.

In some embodiments of the present disclosure, the first resistor R1 and the fourth resistor R4 have an equal resistance value, and the second resistor R2 and the third resistor R3 have an equal resistance value. By calculation, it may be obtained that Vc=(Vr−V1)R1/R2.

Further, when the first resistor R1, the second resistor R2, the third resistor R3, and the fourth resistor R4 all have an equal resistance value, Vc=Vr−V1.

In addition, as shown in FIG. 3, the compensation unit 230 includes a second amplifier A2, a fifth resistor R5, a sixth resistor R6, a seventh resistor R7, an eighth resistor R8, and a ninth resistor R9. In this embodiment, an end of the fifth resistor R5 is coupled to a first input terminal (−) of the second amplifier A2, and another end of the fifth resistor R5 is coupled to the output terminal of the second amplifier A2. An end of the sixth resistor R6 is coupled to the first input terminal (−) of the second amplifier A2, and another end of the sixth resistor R6 is grounded. An end of the seventh resistor R7 is coupled to a second input terminal (+) of the second amplifier A2, and another end of the seventh resistor R7 is coupled to the input terminal M of the compensation circuit, i.e., coupled to the control circuit 110 to receive the second signal V2. An end of the eighth resistor R8 is coupled to the second input terminal (+) of the second amplifier A2, and another end of the eighth resistor R8 is coupled to the storage unit to receive the stored compensation signal Vc. An end of the ninth resistor R9 is coupled to the second input terminal (+) of the second amplifier A2, and another end of the ninth resistor R9 is grounded. The output terminal of the second amplifier A2 is coupled to the output terminal N of the compensation circuit, i.e., coupled to the processing circuit to provide the third signal V3 to the processing circuit.

In some embodiments of the present disclosure, the seventh resistor R7 and the eighth resistor R8 have an equal resistance value. By calculation, it may be obtained that V3=(V2+Vc)[(R7//R9)/(R5//R6)](R5/R7). In the case that R7//R9=R5//R6, V3=(V2+Vc)R5/R7. In this equation, // represents a parallel connection, for example, R7//R9 represents that R7 and R9 are connected in parallel, i.e., $$R7//R9 = \frac{R7 \times R9}{R7 + R9}.$$

Further, in the case that the fifth resistor R5, the seventh resistor R7, and the eighth resistor R8 have an equal resistance value and the sixth resistor R6 and the ninth resistor R9 have an equal resistance value, V3=V2+Vc.

Turning to FIG. 2 again, the processing circuit 130 may include a third amplifier A3 and a capacitor Cf. The first input terminal (−) of the third amplifier A3 is coupled to the output terminal N of the compensation circuit 120, a second input terminal (+) of the third amplifier A3 receives the reference signal Vr, and an output terminal of the third amplifier A3 provides the processed third signal. The capacitor Cf is coupled between the first input terminal (−) of the third amplifier A3 and the output terminal of the third amplifier A3. In some embodiments of the present disclosure, the first input terminal of the third amplifier A3 is also coupled to the first switching element SW1. The two input terminals of the third amplifier A3 are virtual short, thus the voltage of the first input terminal of the third amplifier A3 may be approximately equal to that of the second input terminal (coupled to the reference signal Vr) of the third amplifier A3. That is, the first input terminal of the third amplifier A3 provides the reference signal Vr to the first switching element SW1.

In some embodiments of the present disclosure, the reading apparatus 200 may further include a reset unit 140 coupled between the input terminal of the processing circuit 130 and the output terminal of the processing circuit 130. The reset unit 140 may be, for example, a third switching element SW3, which is coupled between the first input terminal (−) of the third amplifier A3 and the output terminal of the third amplifier A3. The reset unit 140 may, for example, isolate a signal between two ends of the reset unit 140.

As shown in FIG. 2, the reading apparatus 200 may further include a filter 150 and an analog-to-digital converter (i.e., ADC) 160. In this embodiment, the filter 150 is coupled between the processing circuit 130 and the analog-to-digital converter 160, and the analog-to-digital converter 160 is coupled between the filter 150 and the output terminal OUT of the reading apparatus 200. The filter 150 is configured to filter the processed third signal. The analog-to-digital converter 160 is configured to perform analog-to-digital conversion on the filtered third signal.

In addition, FIG. 2 also illustrates a sense unit 300 of the X-ray detector. One end of the sense unit 300 is coupled to a common electrode, and the other end of the sense unit 300 is coupled to the input terminal IN of the reading apparatus 200. The sense unit 300 includes, for example, a sense device (for example, a photosensitive diode PIN) and a control transistor TFT. An end of the photosensitive diode PIN is coupled to a common electrode, and another end of the photosensitive diode PIN is coupled to the input terminal IN of the reading apparatus 200 via the control transistor TFT. When the control transistor TFT is turned on, a signal sensed by the sense unit may be transmitted to the reading circuit 200. When the control transistor TFT is turned off, the signal transmission between the sense unit and the reading circuit 200 is disconnected. In some embodiments of the present disclosure, the X-ray detector may include a plurality of sense units 300. The respective sense units 300 are coupled to the input terminal IN of the reading circuit 200.

In some embodiments of the present disclosure, for a first phase, the sense device PIN in the sense unit 300 is in a dark state. In this phase, the third switching element SW3 is connected. The two input terminals of the third amplifier A3 are virtual short, the voltage of the first input terminal of the third amplifier A3 may be approximately equal to the voltage of the second input terminal of the third amplifier A3. The second input terminal of the third amplifier A3 provides the reference signal Vr. Therefore, the voltage of the first input terminal of the third amplifier A3 is a reference voltage of the reference signal Vr. Correspondingly, the voltage of an end of the first switching element SW1 coupled to the first input terminal of the third amplifier A3 is the reference voltage of the reference signal Vr.

First, the first switching element SW1 is connected, and the second switching element SW2 is disconnected. The reference signal Vr is provided, via the first switching element SW1, to the input terminal IN of the reading circuit 200 (i.e., the input terminal of the compensation circuit). When the control transistor TFT of the sense unit 300 is turned on, the reference signal Vr is transmitted to one end of the sense device PIN.

Then, the first switching element SW1 is disconnected, to stop providing the reference signal Vr. Under ideal conditions, in the dark state, the sense device PIN is not conduct, and the voltage of the input terminal IN remains unchanged, i.e., the reference voltage is held. However, a tiny leakage current (i.e., dark current) may exist in the sense device PIN. A voltage at the input terminal IN may be smaller than the reference voltage due to electric leakage caused by the dark current, for example, changed from the reference signal Vr to the first signal V1 (the reference voltage of the reference signal Vr is greater than the voltage of the first signal V1). In such a case, the second switching element SW2 is connected, such that the first signal V1 of the input terminal IN is transmitted to the calculation unit 210. The calculation unit 210 provides the compensation signal Vc according to the first signal V1 and the reference signal Vr. For example, the calculation unit 210 calculates a difference, as the compensation signal, between the first signal V1 and the reference signal Vr. The storage unit 220 stores the compensation signal Vc.

In some embodiments of the present disclosure, the X-ray detector may include a plurality of sense units 300. Control transistors TFT connected to the sense device PIN of each of the sense units 300 are turned on in sequence, such that the first signal V1 and the compensation signal Vc corresponding to different sense units 300 can be obtained, and the corresponding compensation signal Vc can be stored in the storage unit 220.

In the second phase, the sense device PIN in the sense unit 300 is in a sense state. The second switching element is connected, and both the first switching element SW1 and the third switching element SW3 are turned off. The second signal V2 (a PIN voltage signal in a bright state or the dark state) sensed by the sense device PIN is transmitted to the compensation unit 230. The compensation unit 230 provides the compensated third signal V3 according to the second signal V2 and the compensation signal Vc stored by the storage unit 220. For example, the compensation unit 230 determines the sum, as the third signal, of the second signal V2 and the compensation signal Vc.

Furthermore, the third signal V3 can be processed by the processing circuit 130, filtered by the filter 150, converted by the analog-to-digital converter 160, and then outputted.

Correspondingly, the respective sense units are compensated and subjected to other corresponding operations.

Figure 4:
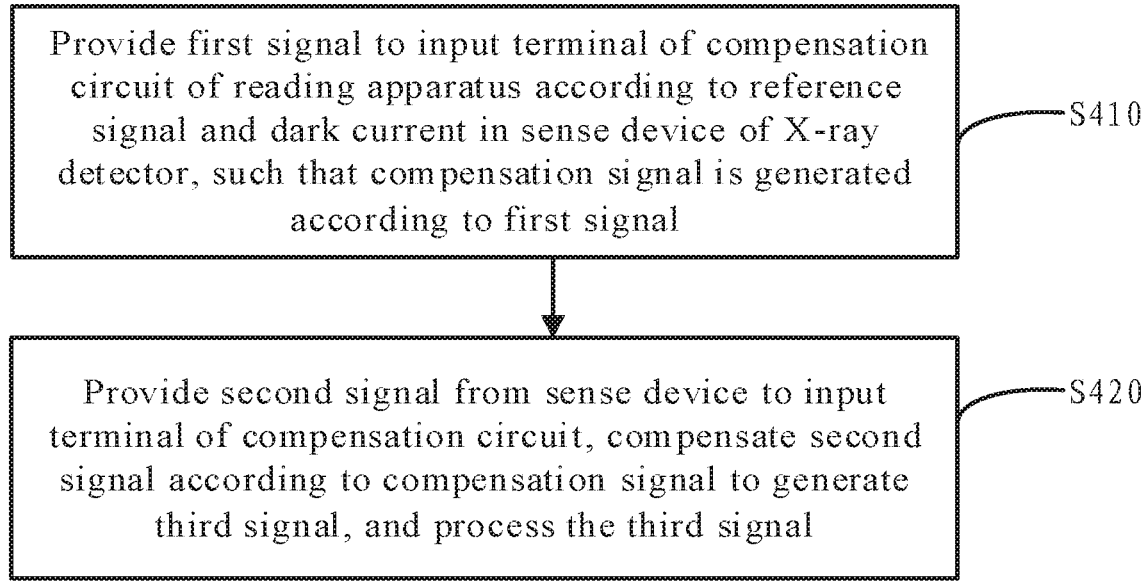
FIG. 4 illustrates a flowchart of a reading method according to an embodiment of the present disclosure.

FIG. 4 illustrates a method for reading an X-ray detector by a reading apparatus according to an embodiment of the present disclosure.

According to this method, in Step S410, a first signal is provided to an input terminal of the compensation circuit according to a reference signal and a dark current in a sense device of the X-ray detector, such that a compensation signal is generated according to the first signal. In some embodiments of the present disclosure, the Step S410 may correspond to a course of the first phase described above.

In Step S420, a second signal from the sense device is provided to the input terminal of the compensation circuit, and the second signal is compensated according to the compensation signal to generate a third signal. Then, the third signal is processed. In some embodiments of the present disclosure, the Step S420 may correspond to a course of the second phase described above.

Figure 5:
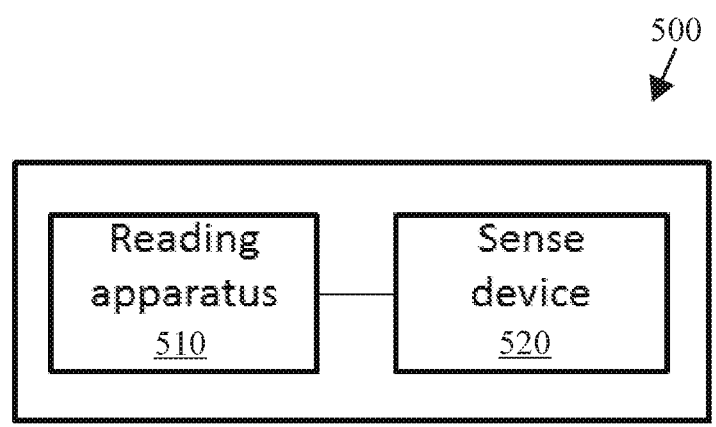
FIG. 5 illustrates a schematic diagram of an X-ray detector according to an embodiment of the present disclosure.

FIG. 5 illustrates an X-ray detector 500 according to an embodiment of the present disclosure. The X-ray detector 500 includes a reading apparatus 510 and a sense device 520. The reading apparatus 510 is, for example, the reading apparatus provided by some embodiments of the present disclosure. The sense device 520 includes a photosensitive sensor such as a photosensitive diode. In some embodiments, the sense device 520 is, for example, the sense device PIN in the sense unit 300 in FIG. 2, wherein one end of the sense device 520 is coupled to a common electrode, and the other end of the sense device 520 is coupled to a first electrode of a control transistor. When the control transistor is turned on, a signal from the sense device is transmitted to a second electrode of the control transistor, and the other end is coupled to the reading apparatus 510. The control transistor is, for example, an N-type thin-film transistor (TFT) or a P-type TFT.

As described above, some embodiments of the present disclosure provide a drive design for improving unevenness in gradation of an X-ray flat panel detector. It is considered a negative effect of electric leakage caused by the dark current of each sense device (such as a photodiode) of the X-ray detector on the voltage at the input terminal in the dark state. Before the actual sensing, the difference between the actual voltage at the input terminal in the dark state and the reference voltage is taken as a voltage compensation reference value corresponding to the dark current of the sense device. Therefore, an active front end (AFE) unit of each sense device has its own independent compensation reference value. In this way, in a sense mode, when the sense device is in the dark state or bright state, the sense voltage is compensated by the compensation reference value, and then is subjected to operational amplification and analog-to-digital conversion, to obtain a homogenized digital signal. Then, homogenized gradation can be displayed.

A plurality of embodiments of the present disclosure are described in detail above. However, the scope of protection of the present disclosure is not limited thereto. Apparently, those of ordinary skill in the art may make various modifications, substitutions, and variations on the embodiments of the present disclosure without departing from the spirit and scope of the present disclosure. The scope of protection of the present disclosure is limited by the appended claims.

What is claimed is:

1. A reading apparatus for an X-ray detector, the reading apparatus comprising:
   a control circuit;
   a compensation circuit; and
   a processing circuit, wherein the control circuit is configured to provide, in a first phase, a first signal to an input terminal of the compensation circuit according to a reference signal and a dark current in a sense device of the X-ray detector, and provide, in a second phase, a second signal from the sense device to the input terminal of the compensation circuit, wherein the compensation circuit is configured to generate, in the first phase, a compensation signal according to the first signal, and compensate, in the second phase, the second signal according to the compensation signal to generate a third signal, wherein the processing circuit is configured to process the third signal, and wherein the compensation circuit comprises:
      a calculation unit, configured to generate the compensation signal according to the first signal;
      a storage unit, configured to store the compensation signal; and
      a compensation unit, configured to compensate the second signal according to the compensation signal stored, to generate the third signal, wherein the compensation unit comprises a summator, wherein a first input terminal of the summator receives the compensation signal, wherein a second input terminal of the summator receives the second signal, and wherein an output terminal of the summator provides the third signal.

2. The reading apparatus according to claim 1, wherein the control circuit comprises:
   a first switching element, wherein an end of the first switching element is coupled to an input terminal of the reading apparatus, and wherein another end of the first switching element is coupled to the reference signal; and a second switching element, wherein an end of the second switching element is coupled to the input terminal of the reading apparatus, and wherein another end of the second switching element is coupled to the input terminal of the compensation circuit.

3. The reading apparatus according to claim 1, wherein the calculation unit comprises a subtracter; and
wherein a first input terminal of the subtracter receives the first signal, wherein a second input terminal of the subtracter receives the reference signal, and wherein an output terminal of the subtracter provides the compensation signal.

4. The reading apparatus according to claim 1, wherein the calculation unit comprises:
a first amplifier, wherein an output terminal of the first amplifier is coupled to the storage unit;
a first resistor, wherein an end of the first resistor is coupled to a first input terminal of the first amplifier, and wherein another end of the first resistor is coupled to the output terminal of the first amplifier;
a second resistor, wherein an end of the second resistor is coupled to the first input terminal of the first amplifier, and wherein another end of the second resistor is coupled to the input terminal of the compensation circuit;
a third resistor, wherein an end of the third resistor is coupled to a second input terminal of the first amplifier, and wherein another end of the third resistor is coupled to the reference signal; and
a fourth resistor, wherein an end of the fourth resistor is coupled to the second input terminal of the first amplifier, and wherein another end of the fourth resistor is grounded.

5. The reading apparatus according to claim 4, wherein the first resistor, the second resistor, the third resistor, and the fourth resistor have an equal resistance value.

6. The reading apparatus according to claim 1, wherein the compensation unit comprises:
a second amplifier, wherein an output terminal of the second amplifier is coupled to the processing circuit;
a fifth resistor, wherein an end of the fifth resistor is coupled to a first input terminal of the second amplifier, and wherein another end of the fifth resistor is coupled to the output terminal of the second amplifier;
a sixth resistor, wherein an end of the sixth resistor is coupled to the first input terminal of the second amplifier, and wherein another end of the sixth resistor is grounded;
a seventh resistor, wherein an end of the seventh resistor is coupled to a second input terminal of the second amplifier, and wherein another end of the seventh resistor is coupled to the second signal;
an eighth resistor, wherein an end of the eighth resistor is coupled to the second input terminal of the second amplifier, and wherein another end of the eighth resistor is coupled to the storage unit to receive the compensation signal; and
a ninth resistor, wherein an end of the ninth resistor is coupled to the second input terminal of the second amplifier, and wherein another end of the ninth resistor is grounded.

7. The reading apparatus according to claim 6, wherein the fifth resistor, the seventh resistor, and the eighth resistor have an equal resistance value, and wherein the sixth resistor and the ninth resistor have an equal resistance value.

8. The reading apparatus according to claim 1, wherein the processing circuit comprises:
a third amplifier, wherein a first input terminal of the third amplifier is coupled to the output terminal of the compensation circuit, wherein a second input terminal of the third amplifier is coupled to the reference signal, and wherein an output terminal of the third amplifier is configured to provide the third signal; and
a first capacitor coupled between the first input terminal of the third amplifier and the output terminal of the third amplifier.

9. The reading apparatus according to claim 8, wherein the control circuit comprises:
a first switching element, wherein an end of the first switching element is coupled to the input terminal of the reading apparatus, and wherein another end of the first switching element is coupled to the first input terminal of the third amplifier; and
a second switching element, wherein an end of the second switching element is coupled to the input terminal of the reading apparatus, and wherein another end of the second switching element is coupled to the input terminal of the compensation circuit.

10. The reading apparatus according to claim 1 further comprising:
a reset unit coupled between an input terminal of the processing circuit and an output terminal of the processing circuit.

11. The reading apparatus according to claim 10, wherein the processing circuit comprises:
a third amplifier, wherein a first input terminal of the third amplifier is coupled to the output terminal of the compensation circuit, wherein a second input terminal of the third amplifier is coupled to the reference signal, and wherein an output terminal of the third amplifier is configured to provide the third signal; and
a first capacitor coupled between the first input terminal of the third amplifier and the output terminal of the third amplifier,
wherein the reset unit comprises a third switching element, and wherein the third switching element is coupled between the first input terminal of the third amplifier and the output terminal of the third amplifier.

12. The reading apparatus according to claim 1 further comprising:
a filter, configured to filter the third signal processed; and
an analog-to-digital converter, configured to convert the third signal filtered.

13. The X-ray detector according to claim 12, wherein the control circuit comprises:
a first switching element, wherein an end of the first switching element is coupled to an input terminal of the reading apparatus, and wherein another end of the first switching element is coupled to the reference signal; and
a second switching element, wherein an end of the second switching element is coupled to the input terminal of the reading apparatus, and wherein another end of the second switching element is coupled to the input terminal of the compensation circuit.

14. An X-ray detector comprising:
a reading apparatus comprising the reading apparatus according to claim 1; and
a sense device.

15. The X-ray detector according to claim 14, wherein the compensation circuit comprises:
- a calculation unit, configured to generate the compensation signal according to the first signal;
- a storage unit, configured to store the compensation signal; and
- a compensation unit, configured to compensate the second signal according to the compensation signal stored, to generate the third signal.

16. A method for using the reading apparatus according to claim 1, the method configured to read an X-ray detector, and the method comprising:
- providing, in a first phase, a first signal to an input terminal of the compensation circuit according to a reference signal and a dark current in a sense device of the X-ray detector, such that a compensation signal is generated according to the first signal; and
- providing, in a second phase, a second signal from the sense device to the input terminal of the compensation circuit, compensating the second signal according to the compensation signal to generate a third signal, and processing the third signal.

17. The method according to claim 16, wherein providing, in the first phase, the first signal comprises providing a reference voltage to the input terminal of the compensation circuit in response to the sense device being in a dark state, and then stopping providing the reference voltage, wherein after stopping providing the reference voltage, the first signal is provided to the input terminal as a result that a voltage at the input terminal is smaller than the reference voltage due to electric leakage caused by the dark current of the sense device, wherein generating the compensation signal comprises calculating a difference, as the compensation signal, between the first signal and the reference signal, wherein compensating, in the second phase, the second signal to generate the third signal comprises calculating a sum, as the third signal, of the second signal and the compensation signal, and wherein processing the third signal comprises filtering and performing analog-to-digital conversion on the third signal.

* * * * *